Nov. 25, 1958  J. E. WHITE ET AL  2,861,645
SEISMIC WAVE ANALYSIS

Filed Dec. 28, 1953  4 Sheets-Sheet 1

JAMES E. WHITE
PHILIP L. LAWRENCE
INVENTORS

BY D. Carl Richards
ATTORNEY

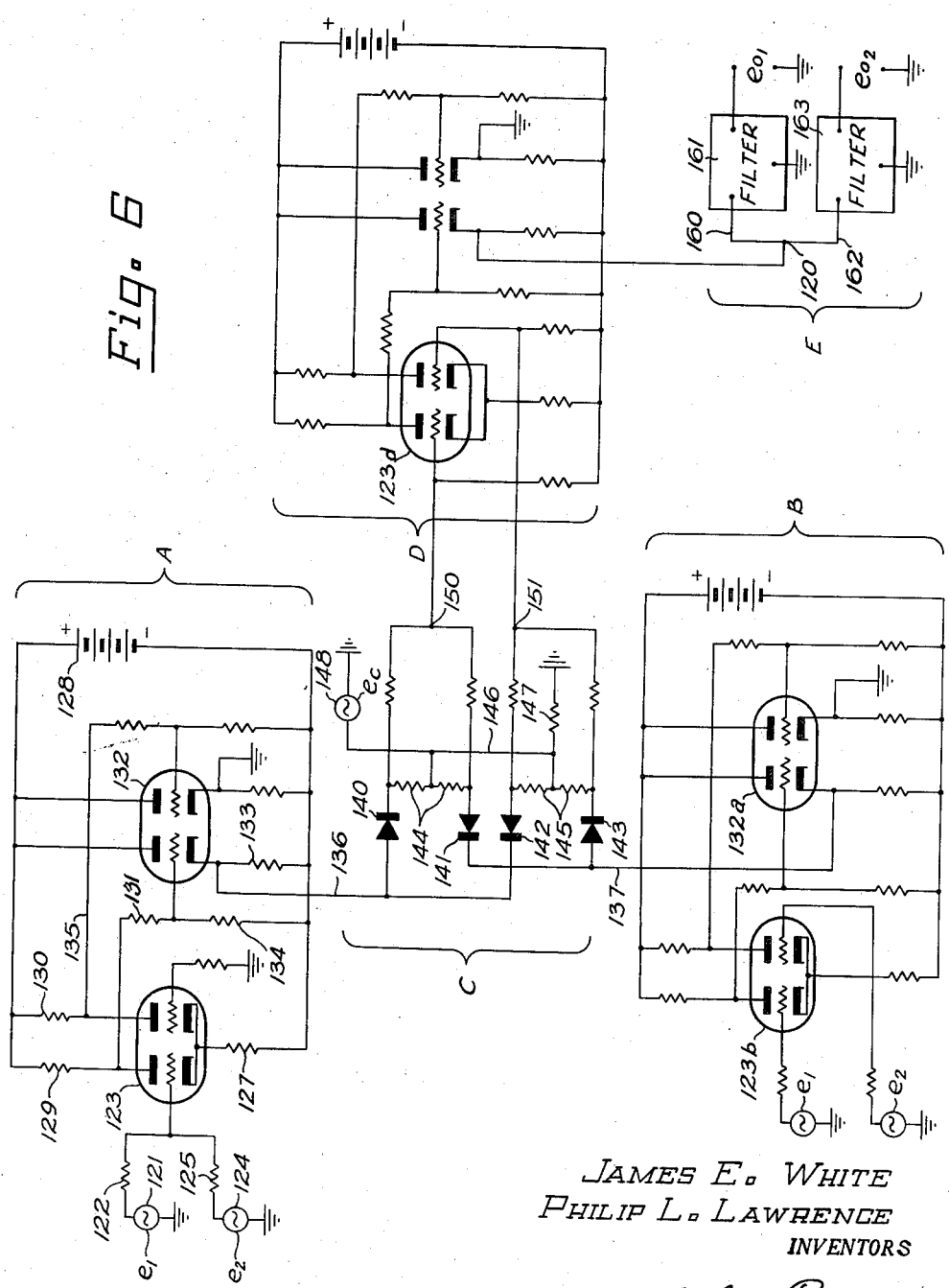

United States Patent Office 2,861,645
Patented Nov. 25, 1958

2,861,645

SEISMIC WAVE ANALYSIS

James E. White and Philip L. Lawrence, Dallas, Tex., assignors, by mesne assignments, to Socony Mobil Oil Company, Inc., a corporation of New York Application December 28, 1953, Serial No. 400,454

7 Claims. (Cl. 181—.5)

This invention relates to directionally preferential acoustic energy detection and more particularly to enhancement of signal to noise ratio.

This application is a continuation-in-part of application Serial No. 329,989, filed January 7, 1953, and now abandoned.

In seismic exploration, sonic navigation and fields utilizing acoustic sensing means, a continuing effort has been expended in an attempt to exact a greater yield of useful information through use of various new working tools. In spite of the advancements made in implementation and technique, many geographical areas have proven extremely difficult to delineate by means of seismic procedures for a number of reasons, among which are high background noise and near surface discontinuities both of which make difficult the interpretation of seismic waves detected at spaced points along a spread. In navigation and other marine operations acoustic "noise" energy is a significant deterrent.

The present invention relates to directionally preferential studies of acoustic energy. For example, in seismic exploration signals received at the earth's surface are treated in such a manner as to emphasize coherent energy in preference to random noise. Effective directivity is achieved by data manipulations as contrasted with prior art approaches in which only the physical relationships of components of the detecting system are varied.

In accordance with the present invention, signals corresponding with particle motion or to pressure at a plurality of detecting stations are multiplied together and selected product components are then recorded to produce an indication of the sound energy of a distinctive character with an improved signal to noise ratio. Further, applying the method of the present invention to seismic exploration, a plurality of spaced apart charges may be detonated in a selected orientation to each other and to a detecting spread to modify the character of the energy at detecting or receiving stations, whereby product components of seismic signals particularly emphasize their selectivity and directivity character.

For a further understanding of the present invention and for a more complete description thereof, reference may now be had to the following description taken in conjunction with the accompanying drawings in which:

Fig. 1 illustrates a seismic record produced in accordance with the present invention;

Fig. 2 in block diagram form illustrates a seismic recording system;

Fig. 6 illustrates a modified form of a multiplier-filter system.

Figure 1:
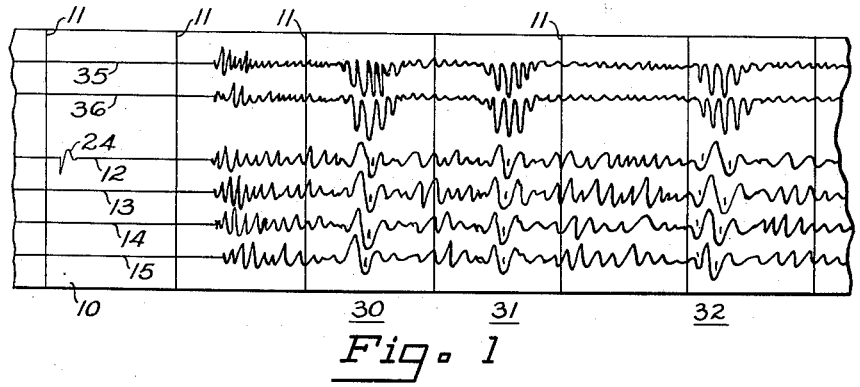

In considering the above-identified drawings and the following description, it should be kept in mind that the invention will be described in connection with its particular application to seismic exploration whereby its applicability in this and other fields may best be appreciated. Basically, selected products of acoustic signal multiplication have been found to yield unusually directive resultant patterns greatly to enhance the signal to noise ratio for selected product components. This result may perhaps be best understood by referring to Fig. 1 where a seismic record obtained in accordance with the present invention has been reproduced. The record 10 comprises a plurality of traces or undulating lines which vary in accordance with seismic signals along a time scale marked by timing lines 11 which, in a general way, indicate that the record has a linear time base and that the signals thereon are varying in the time domain. The four bottom traces, 12, 13, 14 and 15, represent seismic signals detected at each of four separate spaced apart detecting locations on the earth's surface. The traces may be considered as resulting from signals detected by geophones 12a, 13a, 14a and 15a of Fig. 2.

The array of detectors 12a–15a along with geophones 16a and 17a will be recognized as forming a conventional seismic spread positioned on a straight line radiating from a shot point. The detectors generically represent a means for producing an indication representative of the acoustic energy at each detecting location. The detectors may be of the displacement, velocity or acceleration type or they may be of the type sensitive to pressure variations so long as all units cooperating in a given detecting scheme are identical in their characteristics. At the shot point a charge 18 is located and detonated in a bore hole 19. A blaster 20, connected by way of circuit 21 to an amplifying bank 22, is utilized to produce a time break signal coinciding in time with the detonation of the explosive charge 18. The time break signal appears as a pulse 24 on trace 12 of Fig. 1. Coherent bursts of energy indicative of reflected energy stand out at points 30, 31 and 32. Intermediate each of the plotted reflections each of the traces is characterized by high level random energy.

In accordance with the present invention, the signals corresponding to traces 12–15 are multiplied together and product components are recorded to produce a new and distinctive type seismic record. The two top traces 35 and 36 are representative of the type product record that is obtained by multiplying traces 12–15. The signal appearing on trace 35 represents the product of multiplication of the signals on traces 12 and 13 while the signal on trace 36 represents the product of the signals on traces 14 and 15.

Immediately apparent are two distinctive characteristics. First, there is a very low frequency component, approaching D. C., of substantial amplitude at a time corresponding with the coherent reflection energy of traces 12–15. Second, the predominant frequency of the coherent portions of traces 35 and 36 is double that of the corresponding traces 12–15. Intermediate the coherent energy portions of traces 35 and 36, the trace amplitudes are relatively low compared to the amplitude at the coherent portions so that the presence of reflected energy appears in bold relief against a low background.

Figure 2:
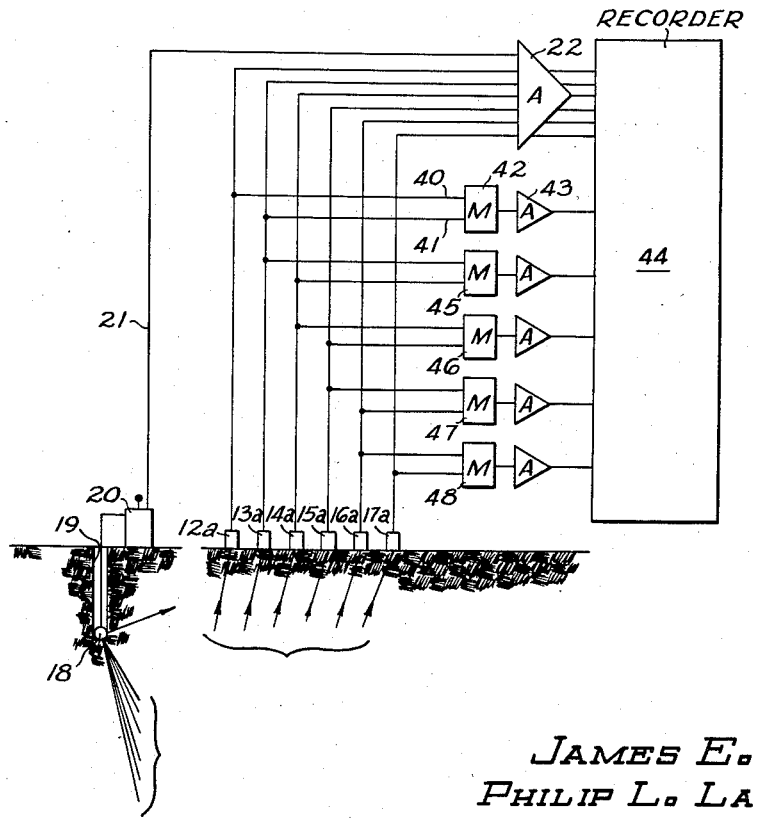

Fig. 2 diagrammatically illustrates a system suitable for producing the product of signals. The signals from geophones 12a and 13a are applied by way of channels 40 and 41 to a multiplier 42 whose output is impressed upon an amplifier 43 which in turn energizes the recorder 44. Similarly, signals from geophones 13a and 14a are treated by a multiplier 45, the signals from geophones 14a and 15a by a multiplier 46, the signals from geophones 15a and 16a by a multiplier 47 and the signals from geophones 16a and 17a by multiplier 48.

Figure 3:
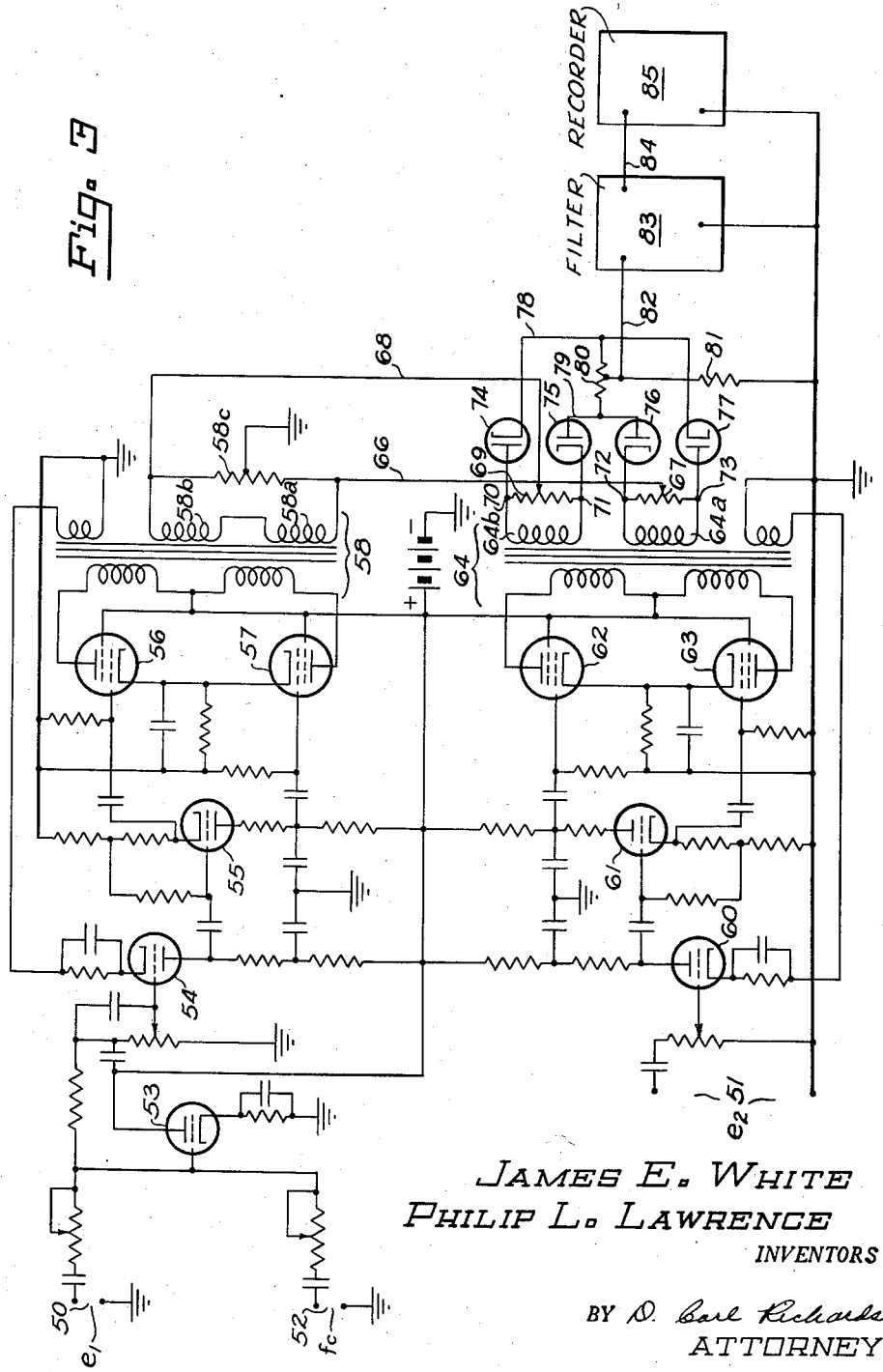
Fig. 3 is a circuit diagram including a multiplying circuit suitable for carrying out the present invention.

The multipliers 42 and 45–48 of the type construction illustrated in Fig. 3 have been found to be suitable for the multiplication of the complexly varying signals. This multiplying device is described in detail and is claimed in co-pending application Serial No. 330,122 of Robert L. Mills and Joseph Zemanek, Jr., co-workers of applicants. Quite briefly the operation of the system is as follows. A first seismic signal $e_1$ is applied to a first pair of input terminals 50. A second seismic signal $e_2$ is applied to a second pair of input terminals 51. Multiplication is accomplished by introducing into the third pair of input terminals 52 a carrier function $f_c$ having a frequency which is high compared to the frequency components of either $e_1$ or $e_2$ and having an amplitude that is not substantially smaller than the maximum instantaneous sum of $e_1$ and $e_2$. The voltage $e_1$ and the carrier function $f_c$ are mixed at the grid of a first tube 53 and are transmitted through a tube 54 to a phase inverter 55 for excitation of the push-pull amplifying stage comprised of tubes 56 and 57. The output of the push-pull stage is then applied to an output transformer 58.

The signal $e_2$ is applied through amplifier tube 60 to a phase inverter stage including tube 61 and thence to the second push-pull amplifier including tubes 62 and 63. The output of the push-pull stage (tubes 62 and 63) is then applied to a second transformer 64.

The secondary windings 58a and 58b of transformer 58 are shunted by a center tapped impedance 58c. The center tap on impedance 58c is connected to ground. The lower terminal of winding 58a is connected by way of conductor 66 to a center tap on an impedance 67 connected across a first secondary winding 64a of transformer 64. Similarly, the upper terminal of the secondary winding 58b is connected by way of conductor 68 to a center tap on an impedance 69 connected across the terminals of the second secondary winding 64b of transformer 64.

For convenience, the output of the push-pull stage including tubes 56 and 57 (i. e. $e_1+f_c$) will be referred to as a signal $S_1$, and the output of the push-pull amplifier including tubes 62 and 63 (i. e. $e_2$) will be referred to as a signal $S_2$. It will now be seen that the voltage between point 70 and ground is equal at any instant to $+(S_1+S_2)$. The voltage at point 71 is equal to $+(S_1-S_2)$. The voltage at point 72 is equal to $-(S_1-S_2)$, and the voltage at point 73 is equal to $-(S_1+S_2)$.

The voltages appearing at points 70–73 are then applied to a full wave rectifying network including four diodes 74, 75, 76 and 77. The cathodes of diodes 74 and 77 are connected directly together by conductor 78. Similarly the anodes of diodes 75 and 76 are connected directly together by conductor 79. A center tapped impedance 80 is connected between conductors 78 and 79. A load impedance 81 is then connected between the central point on impedance 80 and ground. The output across the load impedance 81 is then applied by way of conductor 82 to a filter 83 whose output in turn is applied by conductor 84 to a suitable registering device or recorder 85.

Multiplication of the two signals $e_1$ and $e_2$ will then be accomplished if the voltages applied to points 70–73 have the character above described. The current pulses flow through resistor 81 at a frequency controlled by the carrier function $f_c$. When both the signals $S_1$ and $S_2$ are either positive or negative, current will flow from the top of resistor 81 to ground; and when $S_1$ and $S_2$ are of opposite sign, current will flow in an opposite direction. The voltage pulses across output resistor 81 then will include components of the carrier frequency. However the dimensions of the pulses are controlled by the two functions $e_1$ and $e_2$. The pulses vary instantaneously in dependence upon the smaller of the two signals $S_1$ and $S_2$ so that the difference between the positive pulses and the negative pulses in a given cycle of $e_1$ and $e_2$ is a measure of the product of $e_1$ and $e_2$.

The product, of course, is the factor of interest in so far as the present invention is applied to seismic recording and for that reason filter 83 is designed to eliminate carrier frequency components of the voltage across resistor 81. Preferably filter 83 will be of the low pass type thus leaving undisturbed the output signal components lower in frequency than the carrier frequency. The filter preferably will be provided with variable selectivity to emphasize particular product components for transmission to recorder 8. The desirability of selecting particular frequency components will be appreciated from the following consideration of the relationships illustrated in Figs. 4 and 5.

Figure 4:
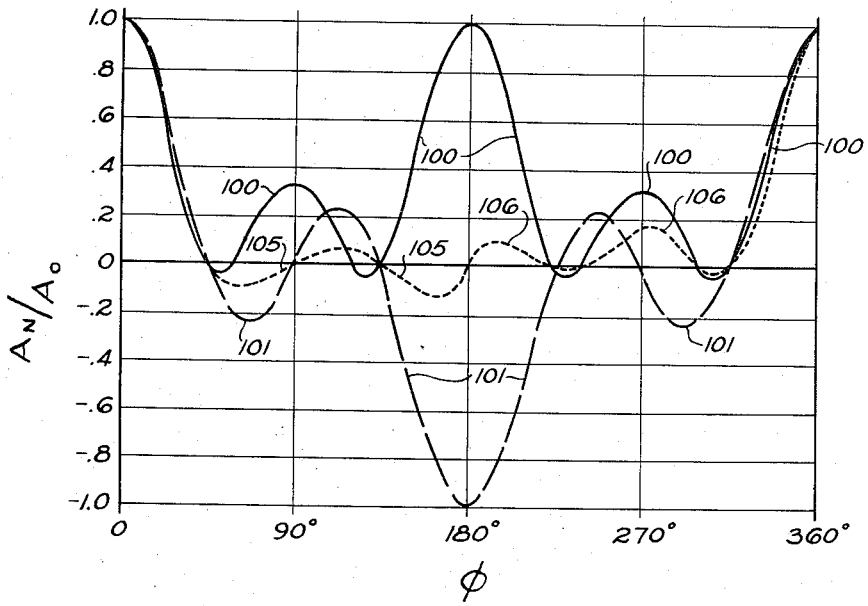
Fig. 4 is a graph illustrating directivity obtained through signal multiplication.

Fig. 4 illustrates variations in the amplitudes of products as a function of phase angle between voltages that are multiplied. The ordinate represents the ratio of the product amplitude of n-signals to the amplitude of a single signal. The abscissa represents phase difference between the n-signals contributing to the product.

In general when an even number of oscillatory signals are multiplied, the product includes a D. C. component and even numbered side bands or "harmonics" as they will hereinafter be referred to. Such side bands or harmonics are identifiable in relation to the frequency components contained in the reflection pulses. More particularly, if two signals are multiplied, the product will include side bands comprising the sum and the difference of the two signals multiplied. Thus for a reflection where the signals have the same frequency components the difference side band would be of zero frequency or D. C. The sum side band would have twice the frequency and thus would correspond with the second harmonic of the frequency of the reflected signals. When an odd number of oscillatory signals are multiplied, the product includes a fundamental and odd numbered harmonics. More particularly, if three signals are multiplied the product will again include side bands of the sum and of the difference of the combinations of the signals multiplied. Thus for multiplication of three reflection signals having the same frequency components, the difference side band would correspond in frequency with that of the signal itself. The sum side band would have a frequency equal to three times the frequency of the signals or correspond with the third harmonic thereof. In Fig. 4 the solid curve 100 represents variations in the D. C. component of the product of four geophone signals as a function of increasing phase angle between each of four signals. When all signals are in-phase, the D. C. curve 100 has a maximum amplitude. When the four signals are separated by phase angles of 45°, the D. C. curve passes through zero and for increasing phase angles becomes slightly negative and then has a positive peak of .333 at 90°. Curve 100 has mirror symmetry with respect to the 90° abscissa, exhibiting a maximum at 0° and 180°. The curve is then identical in the interval 180° to 360°. This means that if a seismic wave train were detected at four points so spaced and oriented that the four signals lagged one another by phase angles of 45°, the D. C. term would be 0. If the phase angle were 90°, the D. C. term would be one-third the amplitude it would have if the signals were in-phase, and if the phase angle were 180°, the D. C. term would be equal to that for signals in-phase, but of opposite sign. Similar variations will be apparent from an inspection of the curve. It is important to note, however, that a maximum D. C. amplitude would be obtained only if the signals were in-phase or out-of-phase. From the standpoint of seismic exploration, the in-phase signals only are of interest. The high response at 0°, 180° and 360° indicates that signals impinging a horizontal seismic spread and coming from reflecting points on substantially vertically displaced reflecting beds would contribute most prominently to the D. C. component in the product of the output of four geophones.

It has been found that the D. C. component in the product of two geophones is directive. However in this case the D. C. component varies as a sine wave, being a maximum at a 0° phase, passing through zero amplitude at 90°, a negative maximum amplitude at 180°, zero amplitude at 270° and a positive maximum at 360°. It will therefore be seen that in so far as the D. C. term is concerned, much greater directivity is obtained by using the product of four geophones rather than two. It is generally recognized that directivity can be enhanced by increasing the number of detectors. However in accordance with the present invention, greater directivity is obtained by multiplication of signals than is possible with the procedures generally employed.

The double frequency component is not highly directionally discriminative in the product of two geophones. However when four geophones are multiplied, the product contains a highly directionally discriminative D. C. component as shown in Fig. 4 (curve 100) and also a directional double frequency component (curve 101, Fig. 4) and a substantially non-directional quadruple frequency component.

The broken line curve 101 illustrates variations in the amplitude of the double frequency component of the product of four geophones. When all four signals are in-phase, the double frequency component represented by curve 101 is a maximum. It passes through zero amplitude at 45° and reaches a negative maximum of .25 and then returns to zero at 90°. The curve is then slightly positive, passing through a maximum of .25, returning to zero at 135°, and then reaching a negative maximum of 1.0 at 180°. In the interval 0° to 180° the curve is skew-symmetrical, and in the interval 0° to 360° the curve is symmetrical, exhibiting mirror symmetry with respect to the 180° abscissa.

Apparent from both the D. C. term, curve 100 in Fig. 4, and the double frequency term, curve 101 in Fig. 4, the product of four geophone signals has a high response when the signals are 180° out-of-phase. While multiplication of four signals greatly enhanced directivity, it would be desirable to eliminate the high response around 180°. This is done by combining multiplication of plural signals with addition as by use of plural sources.

Figure 5:
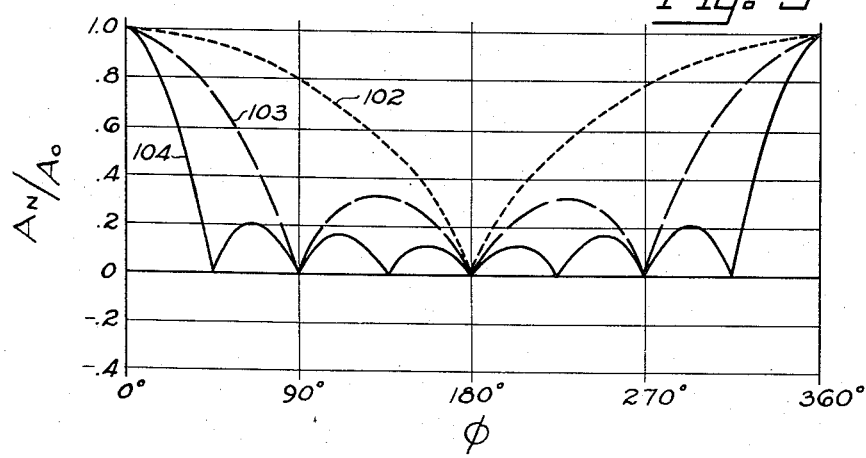
Fig. 5 illustrates directivity obtainable through signal addition.

Consider now Fig. 5 which illustrates simple addition of two geophone signals (the dotted curve 102), of four geophone signals (the broken line 103) and of eight geophone signals (the solid curve 104). It is important to note that all three curves, 102, 103 and 104, exhibit zero response for a phase angle of 180°. It will be appreciated that the same effect will obtain when two explosive charges at a selected spacing are detonated to produce waves detected by a single geophone. It will thus be seen that the high response at 180° of Fig. 4 may be eliminated from the product of plural geophones either by adding geophone signals before multiplication or by using more than one explosive charge to generate the seismic waves. Two shots spaced the same horizontal distance apart as the spacing between geophones in an associated spread will eliminate the high response in both the D. C. component and the double frequency component of the product of the signals from four geophones.

The double frequency component for addition of signals, as by use of two sources combined with multiplication of signals from four detectors, is illustrated in the interval 0° to 180° by the low amplitude dotted curve 105.

The dotted curve 106 in the portion of Fig. 4 from 180° to 360° illustrates the D. C. component of the product of signals from four geophones produced by two charges. Here again, as in the case of the double frequency component, the response near 180° has been greatly reduced so that only "in-phase" signals are of significant amplitude.

Fig. 4 illustrates the fact that the D. C. component and even harmonics of a fundamental are present in the product of an even number of signals and that they may be made highly directive. Similarly, multiplication of an odd number of signals as from five or more geophones makes the fundamental and odd harmonics directive. The advantage therefore to multiplication of seismic signals and to the combination of multiplied and summed seismic signals (or the use of plural seismic shots) is clearly shown by the high discrimination against energy other than reflection energy indicated by curves 105 and 106 of Fig. 4. All signals except those coming from substantially directly below a horizontal spread are attenuated. By introducing predetermined time intervals between the signals, any direction of reception may be emphasized.

It will now be seen that in Fig. 1 the existence of unidirectional or D. C. components is limited to relatively short record sections. Note that traces 35 and 36 are displaced appreciably below their mean positions only in the record intervals 30, 31 and 32. Compared to the high frequency components in intervals 30, 31 and 32, the average displacement of the traces may be considered to be essentially unidirectional. However a truly unidirectional component is not present in either trace but rather the traces are characteristic of very low frequency signals. Therefore for the purpose of this description, the term "D. C. component" shall be taken to mean components such as are generically illustrated in Fig. 1. The term is not to be limited to a truly unidirectional phenomenon such as is more generally identified by the connotation "D. C."

In the foregoing description of Figs. 4 and 5 reference has been made to the utilization of the D. C. component in the product of four seismic signals. It will be apparent that the multiplier of Fig. 3 may be modified slightly to carry into a product voltage at filter 83 unidirectional components of signals applied to terminals 50 and 51. The inductive coupling in transformers 58 and 64 otherwise reduces or eliminates the very low frequency components.

A system suitable for multiplication of signals which include unidirectional components or extremely low frequency components is shown in Fig. 6. The system of Fig. 6 may be considered as comprising five fairly distinct units. In considering Fig. 6, it should be remembered that voltages $e_1$ and $e_2$ are to be so treated that their product appears at an output terminal 120. The multiplication is performed by the system of Fig. 6 in such a manner that the voltage at point 120 is equal to the absolute magnitude of $e_1$ plus $e_2$ minus the absolute magnitude of $e_1$ minus $e_2$ plus a carrier function. This may be expressed mathematically as follows:

$$e_{120} = |e_1 + e_2| - |e_1 - e_2| + e_c$$

Broadly considered, operation in Fig. 6 is such that circuit A produces at its output a voltage proportional to $(e_1 + e_2)$. The circuit B produces a voltage at its output terminal which is $(e_1 - e_2)$. The rectifying circuit C produces a voltage at a first output terminal which is the absolute magnitude of $(e_1 + e_2)$, i. e. $|e_1 + e_2|$ and at a second output terminal a voltage which is the absolute magnitude of $(e_1 - e_2)$, i. e. $|e_1 - e_2|$. The circuit D produces a voltage which is the difference between the two output voltages from circuit C. In the circuit C a carrier frequency is utilized for controlling the conductivities of rectifying elements, and in circuit E the carrier frequency components are eliminated so that voltages at the output of circuit E are representative of selected components of the product of $e_1$ and $e_2$.

The operation of the system of Fig. 6 will now be explained in detail. A first input voltage $e_1$, as produced by a source 121, is applied by way of resistor 122 to a first control grid of a twin triode tube 123. A second input voltage $e_2$, as produced from a source 124, is applied by way of resistor 125 to the first control grid of tube 123. The two cathodes of tube 123 are connected directly together and, by way of a common cathode resistor 127, to the negative terminal of a supply source such as a battery 128. The anode of the first section of tube 123 is connected by way of resistor 129 to the positive terminal of battery 128, and the anode of the second section is connected by way of resistor 130 to the positive terminal of battery 128. The anode of the first section is also connected by way of resistor 131 to the first grid of a second twin triode 132. The anode of the first section of tube 132 is connected directly to the B+ terminal of battery 128. The cathode of said first section is connected by way of resistor 133 to the negative terminal of battery 128. The grid of the first section is connected to the negative terminal by way of resistor 134. The circuit of the second section of tube 132 is identical with that of the first section, except that the control grid is connected to the anode of the second section of tube 123 by way of conductor 135.

In operation $e_1$ and $e_2$ are added together and applied to the grid of the first section of the tube 123. The operation of the second section of tube 123 and the second section of tube 132 is to compensate anode current demands introduced by the use of the common cathode resistor 127. The output voltage from circuit A is taken from the cathode of the first section of tube 132 by way of an output conductor 136. The output voltage from circuit A may be expressed as $(e_1+e_2)$.

The circuit B is similar in construction and operation to circuit A and differs therefrom in that only $e_1$ is applied to the grid of the first section of the input tube 123$b$ and $e_2$ is applied to the grid of the second section of tube 123$b$. The output voltage from circuit B is taken from the cathode of the second stage by way of output conductor 137. The voltage on conductor 137 is proportional to the difference between $e_1$ and $e_2$ and may be expressed as $(e_1-e_2)$.

It should be noted that the cathodes of the second section of tube 132 and of tube 132$b$ are connected directly to ground and are thus the only ground points in the circuit A and circuit B other than those associated with the input voltages $e_1$ and $e_2$. Both circuits A and B therefore suitably pass extremely low frequency components and unidirectional components.

The output voltage from circuit A $(e_1+e_2)$ on conductor 136 is applied to a circuit C which includes a bridge network including rectifiers 140, 141, 142 and 143. Conductor 136 is connected to rectifiers 140 and 142 which are poled opposite each other. Conductor 137 is connected to rectifiers 141 and 143 which are also poled opposite each other. Rectifiers 140 and 141 are interconnected by a center tapped impedance 144. Rectifiers 142 and 143 are interconnected by a center tapped impedance 145. The center taps on impedances 144 and 145 are connected directly together by way of conductor 146 and thence to ground by way of output resistor 147. Conductor 146 is also connected to one terminal of the carrier voltage source 148 whose second terminal is connected to ground.

As explained in detail, in the above-identified application Serial No. 330,112 the carrier voltage from source 148 preferably is large in magnitude compared to voltages on conductors 136 and 137 and thus primarily controls the conductivities of rectifiers 140–143. The voltages on conductors 136 and 137 secondarily modify conductivities of rectifiers 140–143 so that there is produced at a first output point 150 a voltage which is the full wave rectified sum of $e_1$ and $e_2$ (plus the carrier voltage). Similarly, there is produced at the output terminal 151 a voltage which is the absolute magnitude of the full wave rectified difference of $e_1$ and $e_2$ (plus the carrier voltage).

The output voltages at terminals 150 and 151 are then applied to the circuit D which is identical in all respects both in construction and operation with circuit B. The voltage at point 150 is applied to the grid of the first section of the input tube 132$d$. The voltage at point 151 is applied to the grid of the second section of the input 132$d$ so that at the output terminal 120 there appears a voltage proportional to the difference between the absolute magnitudes of the sum of $e_1$ and $e_2$ and the difference between $e_1$ and $e_2$.

Output terminal 120 is connected by way of conductor 160 to a first filter 161 and by way of conductor 162 to a second filter 163.

The filters 161 and 163 may be designed merely to eliminate components of the carrier frequency. The output voltages $e_{o_1}$ and $e_{o_2}$ would then include all frequencies equal to and lower than the frequency of the carrier, i. e. all product components of the input voltages $e_1$ and $e_2$. However, as above described, it is desirable to select certain frequency components of the product voltages in order to produce most distinctive results in the analysis of the complex voltages that may comprise $e_1$ and $e_2$. For example, if it is desired to record the D. C. or unidirectional component, filter 161 may be designed to pass only extremely low frequencies and therefore will produce as an output voltage $e_{o_1}$ a signal which would give the extremely low frequency character such as seen on traces 35 and 36 of Fig. 1.

In order to select the second harmonic, filter 163 may be designed to pass only a selected band of frequencies between D. C. and the carrier frequency. For example, if in a given area of seismic exploration, seismic signals are predominant in the frequency band of from 40 to 60 cycles, the input voltages $e_1$ and $e_2$ may be filtered prior to applying them to the input tubes 123 and 123$a$ so that only signals within the frequency range of 40 to 60 cycles have any substantial effect on circuits A and B. When this is the case, filter 163 may be designed to pass the band of frequencies between 80 and 120 cycles so that fundamental components of the resultant product are completely eliminated and only second harmonic components comprise the output voltage $e_{o_2}$. Voltages $e_{o_1}$ and $e_{o_2}$ may then be mixed for recording as traces 35 and 36, Fig. 1.

It will be seen that the system illustrated in Fig. 6 will readily carry unidirectional components and provides flexibility in filtering ranges while producing a voltage which is a selected component of true product of complex input signals.

It should also be noted that the analysis here described may be carried on through the use of digital computers in which the time-amplitude data such as found on traces 12–15 of Fig. 1 may be transferred to punch card systems and manipulated to generate desired product functions which may be treated as to select unidirectional components and any selected harmonic of a band of seismic frequencies.

While other combinations of steps and systems can be made in accordance with the present invention, the foregoing descriptions of a particular case will indicate the desirability and will demonstrate the method of utilizing multiplication processes for increasing the resolution of seismic data. The directivity of signal components obtained by multiplying seismic signals from four geophones dispersed along a line or over an area of a given dimension is equivalent, within a first approximation, to the directivity of the sum of four geophones in a similar configuration but having dimensions double the dimensions employed in the case of the multiplied signals. Multiplication lends convenience to the field operations and lowers costs involved because shorter seismic spreads may be employed while maintaining equivalent system resolution.

The directivity of components of the product of geophone signals becomes progressively better than the directivity for the summation of geophone signals as the number of signals is increased. This is true even though the spread dimension for a multiplication is one-half that of the spreads used in the summation processes. The utilization of a line array of geophones combined with two appropriately spaced shots lends to a greater directivity than is possible by summing the signals from twice the number of geophones. Further generalizing, in equal dimension grid arrays the combination of four shots and the multiplication of signals from a given number of geophones yield a directivity at least equivalent to and generally better than directivity obtained by summing signals from four times as many geophones.

While the invention has been described and certain modifications thereof presented in detail, it will now be apparent that further modifications may now be made by those skilled in the art and it is intended to cover such modifications as fall within the scope of the appended claims.

What is claimed is:

1. The method of sensing acoustic energy on a directionally preferential basis which comprises producing N signals representative of earth vibrations at N spaced apart receiving stations where N is one numeral of at least 2 in magnitude from the series 0, 1, 2, 3 ... n and which may be odd or even in character, multiplying said signals together to produce a product voltage, filtering from said product voltage frequency components representative of the Mth side band present in said product voltage where M is a numeral from said series of the same character as the numeral N, and recording instantaneous values of said frequency components along a time scale.

2. The method of sensing acoustic energy on a directionally preferential basis which comprises at a plurality of receiving stations spaced along a line producing indications representative of acoustic vibrations at said stations, multiplying even numbers of said indications from adjacent detecting stations to produce product indicia, filtering said product indicia, and selectively registering the D. C. component and even harmonic components of said product indicia.

3. The method of sensing acoustic energy on a directionally preferential basis which comprises at a plurality of receiving stations spaced along a line producing indications representative of acoustic vibrations at said stations, multiplying odd numbers of said indications from adjacent detecting stations to produce product indicia, filtering said product indicia, and selectively registering the fundamental and odd harmonic components of said product indicia.

4. In seismic exploration where seismic waves are generated at a sending station, the method which comprises at detecting stations producing indications representative of resultant earth vibrations at said stations, multiplying an even number of selected ones of said indications, filtering the product of the multiplication to eliminate the fundamental frequency component from the product, and recording the sum of the D. C. component of the product and the even order multiple frequency components of the product.

5. In seismic exploration where seismic waves are generated at a sending station, the method which comprises at detecting stations producing indications representative of resultant earth vibrations at said stations, multiplying an odd number of selected ones of said indications, filtering the product of the multiplication to eliminate the D. C. component thereof, and recording the sum of the fundamental frequency component of the product and the odd order multiple frequency components of the product.

6. The method of seismic exploration which comprises simultaneously generating seismic waves at a pair of sending stations spaced a predetermined distance apart along a line extending along the earth's surface, at four detecting stations located on said line and spaced from each other the same distance as the spacing between said sending stations producing indications representative of the composite earth vibrations produced by generation of seismic waves at both said sending stations, multiplying the four indications thus produced, filtering the product of multiplication selectively to emphasize the unidirectional component and the double frequency component of the product, and recording the sum of the unidirectional component and the double frequency component of the product.

7. The method of seismic exploration which comprises simultaneously generating seismic waves at a pair of sending stations located a selected distance apart along a line extending along the surface of the earth, at a plurality of detecting stations located along said line and spaced one from another the same distance as the spacing between said sending stations producing indications representative of earth vibrations resulting from generation of said seismic waves at said two sending stations, multiplying said indications produced at adjacent receiving stations, filtering the product of multiplication to eliminate alternating current components thereof, and recording the unidirectional component of the product.

References Cited in the file of this patent

UNITED STATES PATENTS

| | | |
|---|---|---|
| 1,799,398 | Taylor | Apr. 7, 1931 |
| 2,099,837 | Blau | Nov. 23, 1937 |
| 2,232,613 | Klipsch | Feb. 18, 1941 |
| 2,244,369 | Martin | June 3, 1941 |
| 2,306,456 | Mayne | Dec. 29, 1942 |
| 2,620,890 | Lee et al. | Dec. 9, 1952 |
| 2,662,126 | Henson | Dec. 8, 1953 |
| 2,688,124 | Doty et al. | Aug. 31, 1954 |